April 14, 1925.
H. BASHIAN
GASOLINE GAUGE
Filed Jan. 24, 1924
1,533,823
*Fig. 1.*
*Fig. 2.*
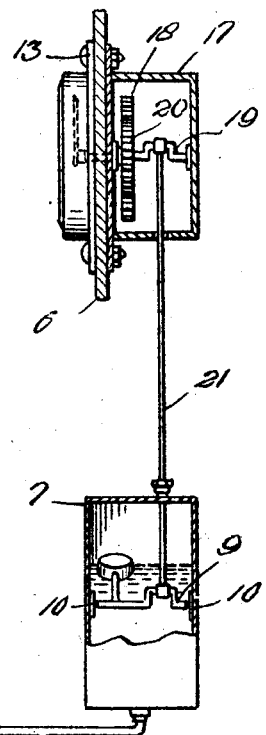
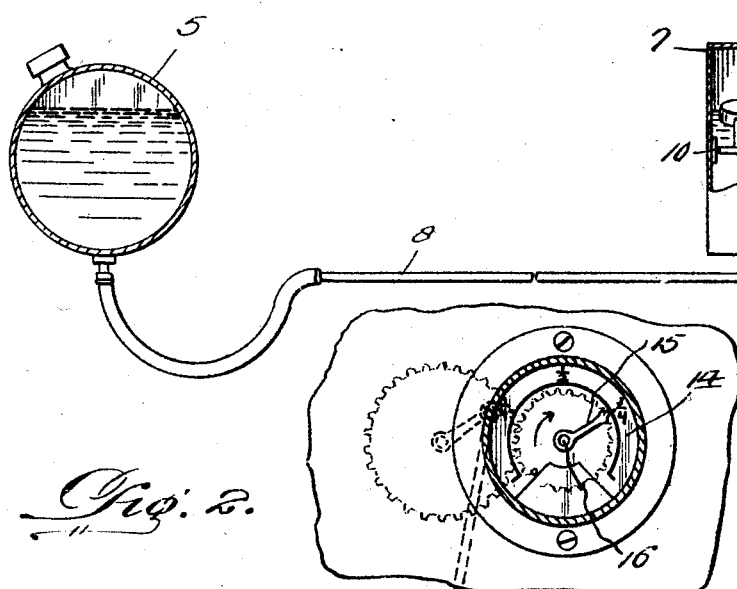
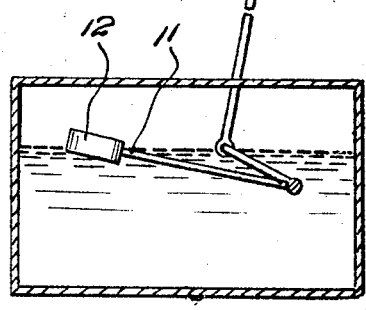
Harry Bashian,
Inventor
By *Clarence A. O'Brien*
Attorney Patented Apr. 14, 1925.

1,533,823

UNITED STATES PATENT OFFICE.

HARRY BASHIAN, OF CHICAGO, ILLINOIS.

GASOLINE GAUGE.

Application filed January 24, 1924. Serial No. 688,234.

*To all whom it may concern:*

Be it known that I, HARRY BASHIAN, a citizen of the United States, residing at Chicago, in the county of Cook and State of Illinois, have invented certain new and useful Improvements in Gasoline Gauges, of which the following is a specification.

This invention relates to an improvement in gauges and has more particular reference to a gauge for the gasoline tanks of motor vehicles, the primary object of the invention residing in the provision of such a device wherein the gauge structure per se may be positioned upon the instrument board of the vehicle for allowing the operator thereof to readily ascertain the amount of gasoline within the tank without the necessity of getting out of the machine for testing the amount of gasoline within the tank in any of the generally followed manners.

An additional object of the invention resides in the provision of such a gauge that may be installed upon practically all types of motor vehicles and one wherein the different parts of the gauge are not liable to readily become out of order.

With the foregoing and other objects in view as the nature of the invention will be better understood, the same consists in the novel form, combination and arrangement of parts hereinafter more fully described, shown in the accompanying drawing and claimed.

In the drawing wherein like reference characters indicate corresponding parts throughout both of the views—

Figure 1 is a detail longitudinal sectional view of a gasoline gauge mechanism constructed in accordance with the present invention, and Figure 2 is a detail vertical cross section thereof.

Now having particular reference to the drawing, 5 indicates the usual gasoline tank of the vehicle which is generally positioned at the rear of the vehicle, and 6 designates the usual instrument board of the vehicle.

A gauge mechanism constructed in accordance with the present invention embodies the provision of a tank 7 of relatively small capacity, and being preferably of angular construction. This tank is positioned at a point preferably beneath the instrument board of the vehicle and in a direct line with the gasoline tank 5 at the end of the vehicle. Between the main gasoline tank 5 and the above mentioned auxiliary tank 7 is a gas line 8 that establishes communication between said tanks.

Within the auxiliary tank 7 is a horizontally arranged crank shaft 9, the opposite ends of which are suitably journaled in bearings 10—10 upon the opposite side walls of the tank. This crank shaft 9 is equipped with an arm 11 upon the free end of which is a suitable form of float 12.

Upon the front side of the before mentioned instrument board 6 is a gauge casing 13 of any desirable type, the same including a graduated face 14 as per Figure 2. Movable in a circular path within said gauge casing is a pointer or hand 15 that is arranged upon the front end of a shaft 16 that extends at this front end through an opening in said instrument board 6. The other end of this shaft 16 extends within a casing 17 upon the rear side of the instrument board and to which is keyed a relatively large spur gear 18. Journaled at its opposite ends within suitable bearings upon the front and rear wall of this casing 17 is a crank shaft 19, keyed to which is a spur gear 20 of relatively smaller dimensions than the dimensions of the gear 18 and being in mesh with said gear 18. The crank portions of the shaft 19 within the casing 17 and of the shaft 9 within the auxiliary tank 7 are inter-connected through the medium of a connecting rod 21.

It will thus be seen that the up and down movements of the float 12 within the auxiliary tank 7 due to the presence of the fluid therein will actuate the hand or pointer 15 within the gauge casing for accurately indicating at all times the amount of gasoline within the main fuel tank 5.

Numerous advantages of a gauge mechanism of this character will be at once apparent to those skilled in the art, and even though I have herein set forth the most practical embodiment of the invention with which I am at this time familiar, it is nevertheless to be understood that minor changes may be made therein without departing from the spirit and scope of the appended claim.

Having thus described my invention, what I claim as new and desire to secure by Letters Patent is:—

A device of the class described comprising a main gasoline tank, an auxiliary tank,

1,533,823

Patented Apr. 14, 1925.

HARRY BASHIAN, OF CHICAGO, ILLINOIS.

GASOLINE GAUGE.

Application filed ...

To all whom it may concern:

Be it known that I, HARRY BASHIAN, a citizen of the United States, residing at Chicago, in the county of Cook and State of Illinois, have invented certain new and useful Improvements in Gasoline Gauges, of which the following is a specification.

This invention relates to an improvement in gauges and has more particular reference to a gauge for the gasoline tanks of motor vehicles, the primary object of the invention residing in the provision of such a device wherein the gauge structure proper may be positioned upon the instrument board of the vehicle for allowing the operator thereof to readily ascertain the amount of gasoline within the tank without the necessity of getting out of the machine for reading the amount of gasoline within the tank in any of the generally followed manners.

An additional object of the invention resides in the provision of such a gauge that may be installed upon practically all types of motor vehicles and one wherein the different parts of the gauge are not liable to readily become out of order.

With the foregoing and other objects in view as the nature of the invention will be better understood, the same consists in the novel form, combination and arrangement of parts hereinafter more fully described, shown in the accompanying drawing and claimed.

In the drawing wherein like reference characters indicate corresponding parts throughout both of the views—

Figure 1 is a detail longitudinal sectional view of a gasoline gauge mechanism constructed in accordance with the present invention, and Figure 2 is a detail vertical cross section thereof.

Now having particular reference to the drawing, 5 indicates the usual gasoline tank of the vehicle, which is generally positioned at the rear of the vehicle, and 6 designates the usual instrument board of the vehicle.

7 is a gauge mechanism constructed in accordance with the present invention embodies the provision of a tank 7 of relatively small capacity, and being preferably of angular construction. This tank is positioned at a point preferably beneath the instrument board of the vehicle and is in direct line with the gasoline tank 5 at the end of a supply pipe leading from the former to the latter, a crank shaft mounted for rotation in said auxiliary tank, an arm carried by said crank shaft, a float connected to said arm, a casing mounted above said auxiliary tank, a second crank shaft, said second named shaft being mounted for operation in said casing, a dial associated with the casing, a pointer cooperative with the dial, a shaft upon which said pointer is mounted, tank 5 and the above mentioned auxiliary tank 7 is a gas line 8 that establishes communication between said tanks.

Within the auxiliary tank 7 is a horizontally arranged crank shaft 9, the opposite ends of which are suitably journaled in bearings 10—10 upon the opposite side walls of the tank. This crank shaft 9 is equipped with an arm 11 upon the free end of which is a suitable form of float 12.

Upon the front side of the before mentioned instrument board 6 is a gauge casing 13 of any desirable type, the same including a graduated face 14 as per Figure 2. Movable in a circular path within said gauge casing is a pointer or hand 15 that is arranged upon the front end of a shaft 16 that extends at this front end and through an opening in said instrument board 6. The other end of this shaft 16 extends within a casing 17 upon the rear side of the instrument board and to which is keyed a relatively large spur gear 18. Journaled at its opposite ends within suitable bearings upon the front and rear wall of this casing 17 is a crank shaft 19, keyed to which is a spur gear 20 of relatively smaller dimensions than the dimensions of the gear 18 and being in mesh with said gear 18. The crank portions of the shaft 19 within the casing 17 and of the shaft 9 within the auxiliary tank 7 are inter-connected through the medium of a connecting rod 21.

It will thus be seen that the up and down movements of the float 12 within the auxiliary tank 7 due to the presence of the fluid therein will actuate the hand or pointer 15 within the gauge casing for accurately indicating at all times the amount of gasoline within the main fuel tank 5.

Numerous advantages of a gauge mechanism of this character will be at once apparent to those skilled in the art, and even though I have herein set forth the most practical embodiment of the invention with which I am at this time familiar, it is never theless to be understood that minor changes may be made therein without departing from the spirit and scope of the appended claim.

Having thus described my invention, what I claim as new and desire to secure by Letters Patent is:

A device of the class described comprising a main gasoline tank, an auxiliary tank, a gear connected to the pointer operating shaft, a second gear connected to said second named crank shaft and in mesh with said first gear, and a rod connected at its opposite ends to said crank shafts, said auxiliary tank and casing being provided with openings through which said rod extends.

In testimony whereof I affix my signature.

HARRY BASHIAN.